Patented Dec. 21, 1937

2,103,136

UNITED STATES PATENT OFFICE 2,103,136

METHOD FOR DETECTING CHEMICALLY REACTIVE GASES

Friedrich Karl Gustav Bangert, Lubeck, Germany, assignor to Otto Heinrich Dräger, Lubeck, Germany No Drawing. Application June 21, 1934, Serial No. 731,794. In Germany June 23, 1933

6 Claims. (Cl. 23—232)

Many gases or suspensions, particularly those containing substances used in gas warfare, are very re-active chemically. Their destructive action is based on their re-activity, particularly on the lung tissues. They are, therefore, effective even when used in very small quantities. For protection against gases used in warfare it is necessary to be able readily and rapidly to detect extremely small quantities of gaseous impurities or suspensions in the air. Also in the chemical industry there are frequently used poisonous and reactive gases the detection of which, in case they should unintentionally pass into the air, is important. It may also be useful to detect the presence of such gases in other neutral gases.

The detection of small quantities of gaseous impurities has heretofore involved the use of relatively complicated apparatus, in which the gas is sucked for example through liquids in order for the presence of impurities to be detected. There have also been used reactive papers, but the method employed has generally not been sufficiently sensitive. Further, it has been necessary to use quite a number of differently prepared papers, if it was desired to obtain general evidence of the presence of any reactive gases at all.

The method according to the present invention avoids these drawbacks. It may be practised in a simple manner and is far-reaching in its scope so far as detection is concerned.

According to the invention an aqueous solution of a coloured inorganic oxidation agent, for example of potassium permanganate, is brought into contact with the air or gas to be tested. The step of effecting contact between the solution and the air or gas can naturally be effected in the usual manner by sucking the air or a part thereof through the reactive solution, for example, a solution of permanganate, which will lose its pink color or will acquire a dirty brown tone when in contact with a chemically reactive substance.

If it is desired to predetermine the scope of the field of detection, the solution can be rendered acid or alkaline before use. Often it is desirable to add a buffer mixture which maintains the hydrogen ion concentration at the same value during the reaction. For example, by addition of a phosphate buffer mixture for pH=7 the reaction of the solution may be maintained permanently at this pH value in order to prevent the solution from deteriorating as regards its sensitivity or its scope by becoming acid or alkaline or losing its colour by spontaneous decomposition.

The method is particularly effective with a solution, the pH value of which may naturally be controlled in this case, as stated, in the following way:

The quantum of gas to be tested is led through a colourless adsorption agent which is neutral to the reaction solution, for example, through active silica gel. Thereby in manner known per se the gas to be tested is enriched on the gel. The reaction solution is poured into the gel so treated and the latter is lixiviated at once with a small quantity of water. When permanganate is employed as a reaction solution, the gel then appears pink at the portions which were free from the oxidizable gas while those portions of the gel upon which the reactive gas accumulated are coloured otherwise. The nature of the gas retained can be determined in that sulphuretted hydrogen gives with permanganate a green colour, formaldehyde gives a permanent brown colour, mustard gas gives first a brown and then a white colour.

Instead of lixiviating with pure water, it may often be desirable to employ a buffer solution which is adjusted to the same pH value as the reaction solution used. As such solutions, there are recommended, besides a solution of permanganate, solutions of chromates or bi-chromates.

It is to be understood that in the specification and claims the term "oxidizable gases" means gases which are capable of being oxidized by the oxidation agent employed for the detection of said gases.

I claim:

1. The method of rendering detectible absorbable oxidizable gases or vapors in air or other neutral gases, which consists in bringing the gas in contact with a colorless adsorbing gel, whereby the gas is enriched on the gel, and then impregnating the gel after adsorption of the gas with an aqueous solution of an inorganic oxidation agent which changes color upon reduction.

2. A method as claimed in claim 1 wherein the oxidation agent is permanganate.

3. In a method as claimed in claim 1, wherein the oxidation agent is permanganate, the step of lixiviating the impregnated gel with water after the impregnation of the gel with the permanganate solution.

4. In a method as claimed in claim 1, wherein the oxidation agent is permanganate, the step of lixiviating the impregnated gel with a buffer solution of a pH value corresponding to that of the permanganate solution after the impregnation of the gel with the permanganate solution.

5. In a method as claimed in claim 1, said solution of the inorganic oxidizing agent comprising a solution of a permanganate and a buffer in such proportions as to maintain the pH value of the solution at a predetermined value.

6. In a method as claimed in claim 1, said solution of the inorganic oxidizing agent comprising a solution of a permanganate and a buffer in such proportions as to maintain the pH value of the solution at approximately 7.

FRIEDRICH KARL GUSTAV BANGERT.